Aug. 13, 1968  R. H. EDWARDS ET AL  3,396,774
INFLATION VALVES
Filed May 24, 1966

REGINALD HAROLD EDWARDS
THOMAS HOLMES
INVENTORS

By Rauber & Lazar
ATTORNEYS

United States Patent Office 3,396,774
Patented Aug. 13, 1968

3,396,774
INFLATION VALVES
Reginald Harold Edwards and Thomas Holmes, Sutton Coldfield, England, assignors to Dunlop Rubber Company Limited, London, England, a British company
Filed May 24, 1966, Ser. No. 552,565
Claims priority, application Great Britain, June 8, 1965, 24,107/65
7 Claims. (Cl. 152—427)

ABSTRACT OF THE DISCLOSURE

An inflation valve comprising a tubular body portion and a tongue secured by at least one surface to a support member for an inflatable body, a valve assembly secured within the tubular body portion and the tongue being of smaller overall thickness than the overall thickness of the tubular body portion, this tongue having a bore formed within it which extends longitudinally of the tongue and having an outlet formed at one end for communication with the inflatable body, the bore communicating at its one end with the tubular body portion and at its other end with the outlet.

---

This invention relates to inflation valves and particularly to valves for tubeless pneumatic tyres.

Inflation valves for tubeless pneumatic tyres currently used extend from a head portion projecting beyond the radially outer surface of a wheel rim through the wheel rim to project radially inwardly of the wheel. Where it is desired to have wide and comparatively large diameter brakes used in association with these wheels the radially inward projection of the inflation valve severely restricts the space available and the amount by which the brakes can be nested within the wheel. Furthermore, the currently used valves, in projecting radially outwardly, restrict or prevent the fitting of tyres if little or no "well" is available in the wheel rim.

According to the invention there is provided an inflation valve comprising a tubular body portion having a valve assembly therein and a tongue having a smaller overall thickness than the overall thickness of the body portion, said tongue having a bore extending longitudinally thereof which communicates at its one end with the tubular body portion and which has an outlet at its other end for communication with an inflatable body, said tongue being securable by at least one surface to a support member for said inflatable body.

Preferably the tongue is of greater width than thickness, the surface by which the tongue is secured to a support member for an inflatable body comprising that surface extending across the width of the tongue.

In accordance with a further aspect of the invention there is provided a support member for an inflatable body having an inflation valve secured thereto comprising a tubular body portion having a valve assembly therein and a tongue having a smaller overall thickness than the overall thickness of the body portion, said tongue having a bore extending longitudinally thereof which communicates at its one end with the tubular body portion and which has an outlet at its other end for communication with the inflatable body, the tongue being secured by at least one surface to the support member.

The support member preferably comprises an annular member for carrying an annular inflatable body thereon, for example, the support member may comprise a vehicle wheel for carrying a pneumatic tyre thereon. In this construction the longitudinal axis of the tongue of the inflation valve is substantially parallel to the axis of said annular member and the body portion of the valve extends axially of the annular member.

At least the tongue of the valve may be formed of metal such as brass or coated steel or alternatively the tongue may be formed of a plastics material such as polycarbonate.

In this case where the tongue is formed of metal it is preferred that the tongue is soldered to the support member or alternatively it may be bonded, welded or rivetted or eyeletted in the manner as described in co-pending United States patent application No. 543,754.

In the case where the tongue is formed of a plastics material the tongue may be secured to the support member by an epoxy resin adhesive.

Embodiments of inflation valve for a tubeless pneumatic tyre will now be further described in more detail with reference to the accompanying drawings wherein.

Figure 2:
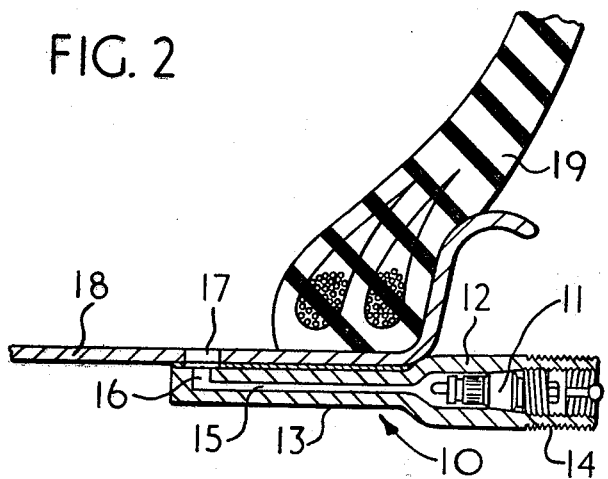
FIGURE 2 is a side view of the valve secured to a wheel rim.
Figure 1:
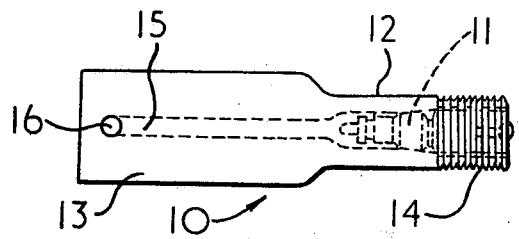
FIGURE 1 is a plan view of one form of inflation valve.

In this construction the inflation valve comprises a valve body 10 and a conventional type of valve assembly 11 detachably secured therein. The valve body is formed of brass and comprises a tubular body portion 12 at its one end which is integral with a tongue 13 of rectangular form at the other end of the valve body, said tongue being of considerably greater width than thickness.

That end 14 of the tubular portion 12 which is remote from the tongue 13 is screw-threaded both internally and externally whereby the valve assembly 11 may be secured within the tubular portion and a conventional type of dust cap (not shown) secured on the exterior of the tubular portion.

The tongue 13 is formed with a small diameter circular cross-sectional bore 15 extending longitudinally thereof and co-axially with the tubular portion. That end of the bore 15 remote from the tubular portion 12 has an outlet 16 on one of the wider surfaces of the tongue at a position spaced away from that end of the tongue which is remote from the tubular portion 12.

Such a construction of inflation valve is particularly suitable for wheels wherein the bead seats are normal or substantially normal to the mid-circumferential plane of the wheel, the radially inner surface of such seats together being of cylindrical form, a part of such a wheel being shown in FIGURE 2. An aperture 17 is formed in one of the seats 18 which forms part of such cylindrical surface and the inflation valve is secured to the seat 18 in such a position that the outlet 16 of the bore 15 is in alignment with the aperture 17.

The tongue 13 of the inflation valve is secured by soldering to the radially inner surface of one of the bead seats 18 of the wheel to form an air-tight connection thereto and in such manner that the inflation chamber of a tubeless tyre 19 mounted upon the wheel is in communication via the aperture 17 in the bead seat 18 with the interior of the valve body. To assist in securing the inflation valve to the bead seat 18, a pin formed of a material to which the solder will not adhere is temporarily located in the outlet 16 of the valve and is also engaged within the aperture 17 in the seat. This pin serves to prevent the solder from blocking either the outlet 16 or the aperture 17 and also assists in aligning the outlet with the aperture. The pin is removed after the soldering operation is completed.

The valve body is soldered in position in such a manner that the tongue 13 of the body is parallel to and in contact with the radially inner surface of the bead seat 18 with the tubular portion 12 of the valve body extending in an axially outward direction of the wheel normal or substantially normal to the mid-circumferential plane of the wheel. In such a construction of wheel the nave plate is located adjacent that side of the wheel upon which the inflation valve is mounted with a part of the edge of the nave plate cut away to accommodate the inflation valve and the remainder of the edge of the nave plate extending axially inwardly of the wheel to a position which is approximately coincident with the mid-circumferential plane of the wheel. Since the radially inner surfaces of the bead seats are of cylindrical form and the wheel attachment portion of the nave plate is located at one edge of the wheel, the whole of the volume of the wheel within the bead seats may be occupied by the brake drum and the maximum possible diameter and axial width of brake drum may thus be accommodated.

In an alternative construction of valve body the body is made of coated steel and in either of these two constructions the tongue may be bonded or welded to the radially inner surface of one of the bead seats. Alternatively the valve body may be rivetted or eyeletted in position by any one of the constructions described in the above referred to co-pending application.

In a further alternative construction the valve body is formed of a suitable plastics material such as polycarbonate, and the tongue of the valve body is secured to the radially inner surface of one of the bead seats by means of an epoxy resin adhesive.

A considerable advantage to be derived from such a construction of inflation valve as hereinbefore described is that the maximum possible diameter and axial width of braked rum can be accommodated within that part of the wheel bounded by the radially inner surfaces of the bead seats since the valve body does not project radially inwardly thereof. The provision of a tongue of rectangular form on the valve body ensures that a large contact area is presented to the radially inner surface of the bead seat and a good air-tight seal may therefore be obtained between the tongue and the seat. Furthermore there is no projection at all of the valve body through the aperture in the bead seat beyond the radially outer surface of such seat. There is therefore no possibility of the bead portions of a pneumatic tyre fouling the valve during assembly and removal of the tyre from the wheel.

Having now described our invention what we claim is:

1. A support member for an inflatable body and an inflation valve secured thereto, the inflation valve comprising a tubular body portion and a tongue secured by one surface thereof to the support member, a valve assembly secured within said tubular body portion and said tongue being of a smaller overall thickness than the overall thickness of the tubular body portion, said tongue having a bore formed therein which extends longitudinally thereof and having an outlet formed therein at one end thereof for communication with the inflatable body, the bore communicating at its one end with the tubular body portion and at its other end with said outlet.

2. A support member as claimed in claim 1 comprising a wheel rim for carrying a pneumatic tyre thereon.

3. A support member as claimed in claim 2 wherein the longitudinal axis of the tongue is substantially parallel to the axis of the wheel rim and wherein the tubular body portion extends axially of the wheel rim.

4. A support member as claimed in claim 1 wherein the tongue is of greater width than thickness, the surface by which the tongue is secured to the support member comprises that surface extending across the width of the tongue, the outlet is formed in said surface of the tongue and the support member has an aperture formed therein in communciation with said outlet.

5. A support member as claimed in claim 1 wherein the tongue of the inflation valve is formed of metal and said tongue is permanently secured to the support member.

6. A support member as claimed in claim 1 wherein the tongue of the inflation valve is formed of a plastics material and said tongue is secured to the support member by an adhesive.

7. A support member as claimed in claim 6 wherein the plastics material comprises polycarbonate and the adhesive comprises an epoxy resin.

References Cited

UNITED STATES PATENTS 3,074,454   11/1963   Tubbs _____ 152—427

FOREIGN PATENTS 161,031   1/1953   Australia.

ARTHUR L. LA POINT, *Primary Examiner.*

C. B. LYON, *Assistant Examiner.*